(12) United States Patent
Lyons et al.

(10) Patent No.: US 6,473,814 B1
(45) Date of Patent: Oct. 29, 2002

(54) SYSTEM FOR OPTIMALLY TUNING A BURST LENGTH BY SETTING A MAXIMUM BURST LENGTH BASED ON A LATENCY TIMER VALUE AND ADJUSTING THE MAXIMUM BURST LENGTH BASED ON A CACHE LINE SIZE

(75) Inventors: Michael Edward Lyons, Round Rock; Sean Michael McNeal, Austin; Michael Anthony Perez, Cedar Park, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,635

(22) Filed: May 3, 1999

(51) Int. Cl.[7] ............................................. G06F 13/28
(52) U.S. Cl. ............................. 710/35; 710/8; 710/33
(58) Field of Search ............................. 710/8, 10, 35, 710/33

(56) References Cited

U.S. PATENT DOCUMENTS

| | | | | |
|---|---|---|---|---|
| 5,883,670 A | * | 3/1999 | Sporer et al. | 348/441 |
| 5,970,069 A | * | 10/1999 | Kumar et al. | 370/402 |
| 5,978,284 A | * | 11/1999 | Pawlowski | 365/194 |
| 6,092,141 A | * | 7/2000 | Lange | 710/310 |
| 6,185,637 B1 | * | 2/2001 | Strongin et al. | 710/35 |
| 6,289,403 B1 | * | 9/2001 | Fodor | 710/52 |
| 6,292,764 B1 | * | 9/2001 | Avery et al. | 703/14 |
| 6,321,296 B1 | * | 11/2001 | Pescatore | 711/117 |

* cited by examiner

Primary Examiner—Jeffrey Gaffin
Assistant Examiner—Ilwoo Park
(74) Attorney, Agent, or Firm—Volel Emile; Bracewell & Patterson, L.L.P.

(57) ABSTRACT

A method and system for choosing an optimal PCI adapter burst length is disclosed. The optimal burst length is automatically determined by the adapter configuration feature of AIX software using a cache-line size of a PCI bridge and the latency timer value of the target PCI adapter as inputs. The method also provides for a user to be able to override the software-calculated setting.

20 Claims, 3 Drawing Sheets

SYSTEM FOR OPTIMALLY TUNING A BURST LENGTH BY SETTING A MAXIMUM BURST LENGTH BASED ON A LATENCY TIMER VALUE AND ADJUSTING THE MAXIMUM BURST LENGTH BASED ON A CACHE LINE SIZE

BACKGROUND OF THE INVENTION

1. Technical Field

The present invention relates in general to a method and system for data processing and, in particular, to a method and system for handling Peripheral Component Interconnect (PCI) local bus accesses within a computer system. Still more particularly, the present invention relates to a method and system for determining the optimal burst length along a PCI bus utilizing a cache-line size of a PCI Host Bridge and a target adapter's latency timer value within a computer system.

2. Description of the Related Art

A computer system typically includes several types of buses, such as a system bus, local buses, and peripheral buses. Various electronic circuit devices and components are connected through the use of adapters with each other via these buses such that intercommunication may be possible among all of these devices and components. In general, a central processing unit (CPU) is attached to a system bus, over which the CPU communicates directly with a system memory that is also attached to the system bus. In addition, a local bus may be used for connecting certain highly integrated peripheral components rather than the slower standard expansion bus. One such local bus is known as the Peripheral Component Interconnect (PCI) bus.

Under the PCI local bus standard, peripheral components can directly connect to a PCI local bus without the need for glue logic, the "profusion of chips needed to match the signals between different integrated circuits." Thus, PCI provides a bus standard on which high-performance peripheral devices, such as graphics devices and hard disk drives, can be coupled to the CPU through the use of PCI adapters, thereby permitting these high-performance peripheral devices to avoid the general access latency and bandwidth constraints. These peripheral devices typically include input/output (I/O) devices such as a keyboard, floppy drives, and printers. Some PCI adapters allow software to control the amount of data the adapter will burst across the PCI bus in a single bus ownership. Therefore, the burst length may make a significant (positive or negative) impact on performance.

Furthermore, if the burst length is too low, required throughput rates for some PCI devices may not be achieved. If the burst length is too high, other PCI devices may experience underruns. Also, an excessive burst length may lead to inefficient subsequent accesses to memory, if the latency timer expires in mid-burst and the PCI device needs to realign to a cache boundary before resuming full bursts. The problem of choosing a burst value is complicated by the fact that the optimal value is dependent on the particular PCI Host Bridge being used, PCI bus speed, and the requirements of other PCI devices on the same bus.

Therefore, it is desirable in a PCI-based system requiring multiple PCI host bridges supporting multiple PCI buses, that optimal burst lengths be chosen to help take advantage of data pre-fetching by the PCI Host Bridge, thereby increasing throughput and memory bus efficiency. The subject invention herein solves all these problems in a new and unique manner that has not been part of the art previously.

SUMMARY OF THE INVENTION

In view of the foregoing, it is therefore an object of the present invention to provide an improved method and system for data processing.

It is another object of the present invention to provide an improved method and system for choosing the optimal PCI adapter burst length In accordance with the method and system of the present invention, the optimal burst length is automatically determined by the adapter configuration feature of AIX software using a cache-line size of a PCI bridge and the latency timer value of the target PCI adapter as inputs. The method also provides for a user to be able to override the software-calculated setting.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be applicable in a variety of computers under a number of different operating systems. The computer may be, for example, a personal computer, a minicomputer, or a mainframe computer. For the purpose of illustration, a preferred embodiment of the present invention, as described below, is implemented on a minicomputer, such as the RS/6000 supporting an AIX operating system (series manufactured by International Business Machines Corporation).

Figure 1:
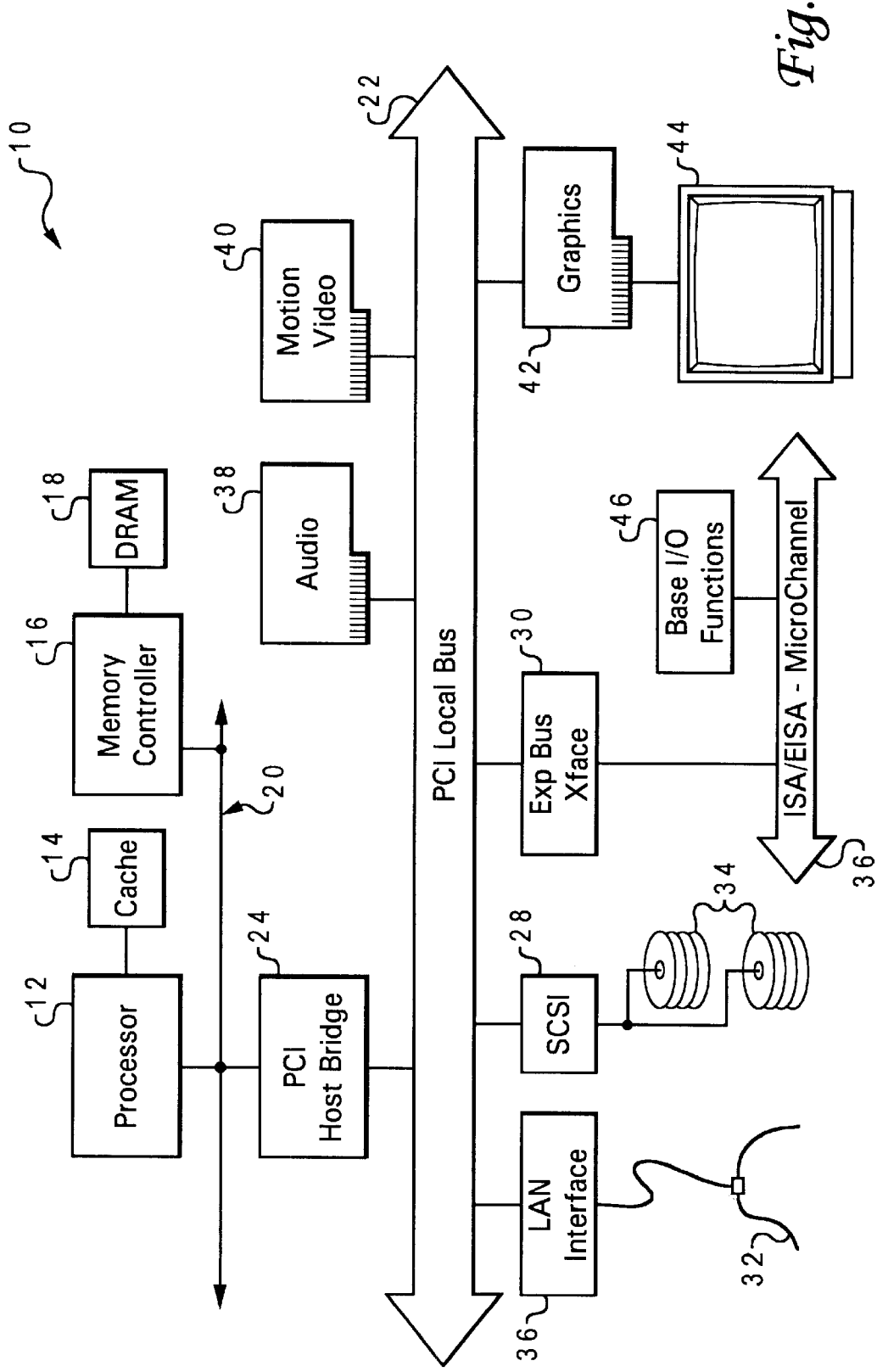
FIG. 1 is a block diagram of a typical computer system having a PCI local bus architecture, which may utilize a preferred embodiment of the present invention.

Referring now to the drawings wherein like reference numerals refer to like and corresponding parts throughout, and in particular to FIG. 1, there is depicted a block diagram of a typical computer system 10 having a PCI local bus architecture, which may utilize a preferred embodiment of the present invention. As shown in FIG. 1, a processor 12, cache memory 14, memory controller 16, and a Dynamic Random Access Memory (DRAM) 18 are all connected to a system bus 20 of a computer system 10. Processor 12, cache memory 14, memory controller 16, and DRAM 18 are also coupled to a PCI local bus 22 of computer system 10 through a PCI host bridge 24. PCI host bridge 24 provides a low latency path through which processor 12 may directly access PCI devices mapped anywhere within bus memory and/or I/O address spaces. PCI host bridge 24 also provides a high bandwidth path for allowing a PCI device to directly access DRAM 18. By way of example, but not of limitation, the PCI host bridge 24 may include various functions such as data buffering/posting and arbitration.

Referring once again to FIG. 1, also attaching to PCI local bus 22 may be other devices such as a local-area network (LAN) interface 26, a small computer system interface (SCSI) 28 and an expansion bus interface 30. LAN interface 26 is for connecting computer system 10 to a local-area network 32 such as to an Ethernet or Token-Ring. SCSI interface 28 is utilized to control high-speed SCSI disk drives 34. Expansion bus interface 30 couples any other expansion buses 36 such as an ISA bus, EISA bus, and/or MicroChannel Architecture (MCA) bus to the PCI local bus 22. Typically, various peripheral devices for performing certain basic I/O functions 46 are attached to one of expansion buses 36.

In general, PCI local bus 22 due to loading effects on the bus supports up to four addin board connectors without requiring any expansion capability, such as adding a second PCI local bus not shown. Audio adapter board 38, motions video adapter board 40, and graphics adapter board 42 connected to a monitor 44 are examples of some devices that may be attached to PCI local bus 22 via addin board connectors as shown in FIG. 1.

Figure 2:
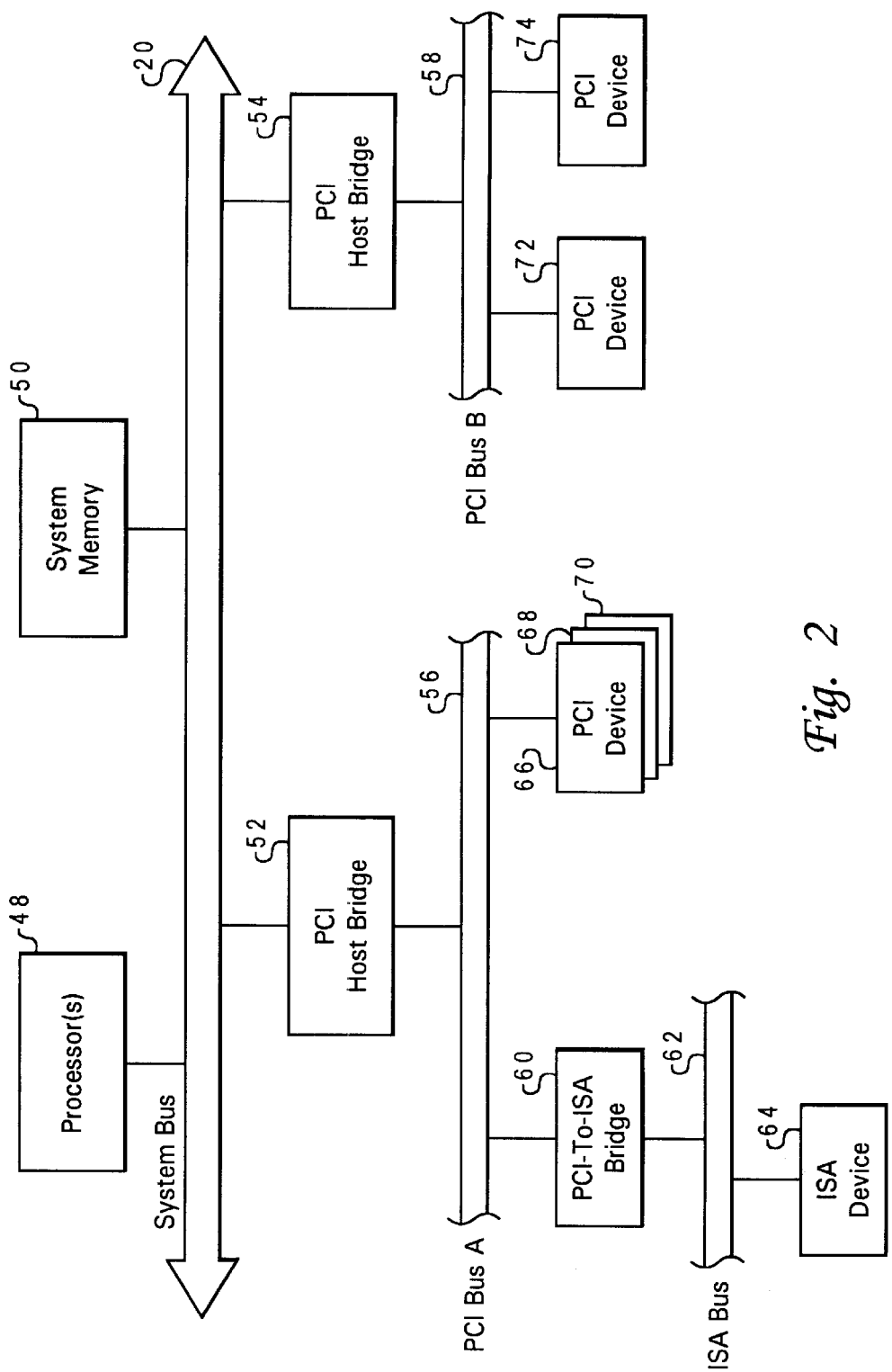
FIG. 2 is a block diagram of a typical computer system having separate PCI local buses under separate PCI host bridges which may utilize a preferred embodiment of the present invention.

With reference now to FIG. 2, there is illustrated a computer system configuration having separate PCI local buses under separate PCI host bridges. As shown, processor(s) 48 and a system memory 50 are coupled for communication over a system bus 20. By way of example but, not of limitation, system bus 20 provides a 32-bit memory address space and a 16-bit I/O address space. A PCI host bridge 52 enables communications between bus agents having adapters coupled to system bus 20 and bus agents having adapters coupled to a PCI local bus A 56. Further, a PCI-to-ISA bridge 60 enables communications between bus agents (ISA device 64) coupled to an ISA bus 62 (ISA bus 62 is an expansion bus) and system memory 50. PCI-to-ISA bridge 60 also enables communications between processor(s) 48 and bus agents (ISA device 64) coupled to the ISA bus 62.

With reference still to FIG. 2, PCI devices 66, 68 and 70 are bus agents coupled for communication over PCI local bus A 56. In addition, PCI host bridge 52 and PCI-to-ISA bridge 60 are coupled as bus agents for communication over PCI local bus 56. PCI host bridge 52 and PCI-to-ISA bridge 60 have the capability to be initiators and targets for access cycles over PCI local bus 56. Turning once again to FIG. 2, in addition to PCI host bridge 52, a second PCI host bridge 54 is also attached to system bus 20. Similar to PCI host bridge 52, PCI host bridge 54 enables communications between bus agents coupled to system bus 20 and bus agents coupled to a second PCI local bus B 58. Attaching to PCI local bus B 58 are PCI devices, such as PCI device 72 and PCI device 74.

In the past, the burst length from a PCI host bridge along a PCI local bus to a target PCI adapter where a PCI device is housed was hardcoded to a default value. The AIX operating system has the flexibility to allow motivated users to experiment and change the burst length for optimal performance. However, with the wide variety of systems, bridges, and adapters supported by the AIX operating system, this often yielded non-optimal values. Another prior art solution was to load the hard-code knowledge of all specific supported PCI configurations into the software, which is cumbersome and difficult to maintain. The present invention solves these problems by providing tuning software for PCI adapters for AIX or other operating systems. It should be noted however that the burst length is not software configurable for all PCI adapters.

Figure 3:
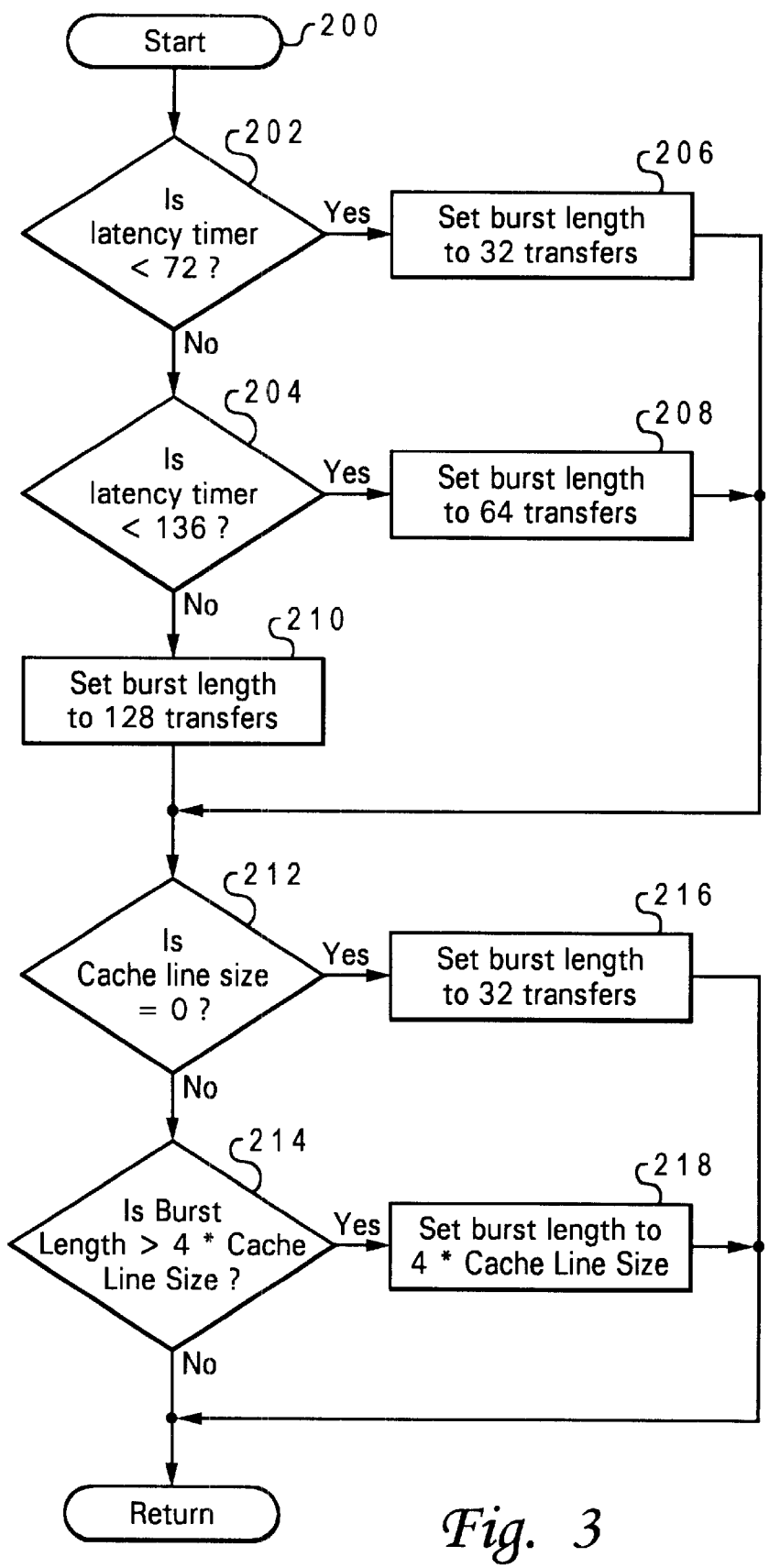
FIG. 3 is a high level flowchart for the method of determining the optimal burst length for a PCI adapter in accordance with a preferred embodiment of the present invention.

Referring now to FIG. 3, there is depicted a high level flowchart for the method of determining the optimal burst length for a target PCI adapter. The method of the present invention uses the adapter configuration feature of the AIX software to determine the optimal burst length using the cacheline size of the PCI host bridge in units of bit words or data units and the latency timer value in units of PCI bus clock speed of the target adapter as inputs.

As depicted, the process starts at block 200 with determining the value of the latency timer and thereafter proceeds to block 202. Block 202 illustrates a determination of whether the latency timer is less than 72. If the latency timer is less than 72, the process passes to block 206. Block 206 depicts setting the burst length to 32 transfers such that the bus will allow up to 32 data transfers during a single burst whereafter the process passes to block 212. For a 32-bit PCI bus (4 bytes per data word), 32 data transfers during a single burst translates to 128 bytes of data (32 transfers* 4 bytes per transfer). It should be understood that a latency timer value of 72 is the number of clock cycles during which 32 data transfers may be easily performed, but during which 64 data transfers would not be reliably performed.

Returning to block 202, if the latency timer value is not less than 72, the process passes to block 204. Block 204 illustrates a determination of whether the latency timer is less than 136. If the latency timer is less than 136, the process passes to block 208. Block 208 depicts setting the burst length to 64 transfers whereafter the process passes to block 212. In setting the burst length to 64 transfers, for a 32-bit PCI bus, 256 bytes of data may be transferred during a single burst.

At block 204, if the latency timer is not less than 136, the process passes to block 210. Block 210 illustrates setting the burst length to 128 transfers whereafter the process passes to block 212. In setting the burst length to 128 transfers, for a 32-bit PCI bus, 512 bytes of data may be transferred during a single burst. Moreover, in block 206, 208, or 210, the maximum burst length is set.

Block 212 depicts a determination of whether the cache line size is equal to zero. In determining if the cache line size is equal to zero, a check is made of whether the firmware has set PCI configuration registers to usable values. On some legacy systems, values such as the latency timer value or cache line size are not set appropriately. If the cache line size is equal to zero, the value is determined to be unusable and the process passes to block 216. Block 216 illustrates setting the burst length to 32 transfers whereafter the process returns.

At block 212, if the cache line size is not equal to zero, the process passes to block 214. Block 214 depicts a determination of whether the burst length is greater than four times the cache line size (4*cache line size). In particular, the burst length is checked to insure that the burst length is not larger than the optimal number of cache lines which may be transferred in a single burst along a 32-bit PCI bus which transfers 4 bytes per data word. However, in alternate embodiments, other values of bytes per data word transferred may be utilized.

At block 214, if the burst length is greater than four times the cache line size, the process passes to block 216. Block 216 illustrates setting the burst length to four times the cache line size in order to appropriately reduce the burst length, whereafter the process returns. If the burst length is not greater than four times the cache line size, the process returns.

It is also important to note that although the present invention has been described in the context of performance tuning of the PCI adapter burst length, those skilled in the art will appreciate that the mechanisms of the present invention can be implemented in software and be distributed as a program product in a variety of forms, and that the present invention applies equally regardless of the particular type of signal bearing media utilized to actually carry out the distribution. Examples of signal bearing media include but are not limited to recordable type media such as floppy disks or CD ROMs, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performance tuning of PCI adapter burst length, comprising the steps of:
   determining a cache line size of a PCI bridge; and
   responsive to determining said cache line size, automatically setting a burst length using said cache line size and a latency timer value of a target PCI adapter for optimally tuning said burst length for said target PdI adapter, including:
   setting a maximum burst length based on said latency timer value; and
   adjusting said maximum burst length based on said cache line size.

2. The method for performance tuning of PCI adapter burst length according to claim 1, wherein said setting a maximum burst length comprises the step of:
   setting said burst length equal to 32 transfers when said latency timer is less than 72.

3. The method for performance tuning of PCI adapter burst length according to claim 1, wherein said setting a maximum burst length comprises the step of:
   setting said burst length equal to 64 transfers when said latency timer is greater than 72 and less than 136.

4. The method for performance tuning of PCI adapter burst length according to claim 1, wherein said setting a maximum burst length comprises the step of:
   setting said burst length equal to 128 transfers when said latency timer is greater than 136.

5. The method for performance tuning of PCI adapter burst length according to claim 1, wherein said adjusting said maximum burst length comprises the step of:
   setting said burst length to 32 transfers, in response to determining that said cache line size is equal to 0.

6. The method for performance tuning of PCI adapter burst length according to claim 1, wherein said adjusting said maximum burst length comprises the step of:
   reducing said burst length to four times the cache line size if said burst length calculated with said latency timer value is greater than four times the cache line size.

7. The method for performance tuning of PCI adapter burst length according to claim 1, further comprising the step of:
   setting the burst length for optimal tuning by a user.

8. A computer system for performance tuning of PCI adapter burst length, comprising:
   means for determining a cache line size of a PCI bridge, and
   means for automatically setting a burst length using said cache line size and a latency timer value of a target PCI adapter for optimally tuning said burst length for said target PCI adapter, including:
   means for setting a maximum burst length based on said latency timer value; and
   means for adjusting said maximum burst length based on said cache line size.

9. The computer system for performance tuning of PCI adapter burst length according to claim 8, wherein said means for setting a maximum burst length comprises:
   means for setting said burst length equal to 32 transfers when said latency timer is less than 72.

10. The computer system for performance tuning of PCI adapter burst length according to claim 8, wherein said means for setting a maximum burst length comprises:
    means for setting said burst length equal to 64 transfers when said latency timer is greater than 72 and less than 136.

11. The computer system for performance tuning of PCI adapter burst length according to claim 8, wherein said means for setting a maximum burst length comprises:
    means for setting said burst length equal to 128 transfers when said latency timer is greater than 136.

12. The computer system for performance tuning of PCI adapter burst length according to claim 8, wherein said means for adjusting said maximum burst length comprises:
    means for setting said burst length to 32 transfers, in response to determining that said cache line size is equal to 0.

13. The computer system for performance tuning of PCI adapter burst length according to claim 8, wherein said means for adjusting said maximum burst length comprises:
    means for reducing said burst length to four times the cache line size if said burst length calculated with said latency timer value is greater than four times the cache line size.

14. The computer system for performance tuning of PCI adapter burst length according to claim 8, further comprising:
    means for setting the burst length for optimal tuning by a user.

15. A computer program product residing on a computer usable medium for providing environmental control and sensing to an information handling system, comprising:
    first instruction means for determining a cache line size of a PCI bridge; and
    second instruction means for automatically setting a burst length using said cache line size and a latency timer value of a target PCI adapter for optimally tuning said burst length for said target PCI adapter, including:
    third instruction means for setting a maximum burst length based on said latency timer value; and
    fourth instruction means for adjusting said maximum burst length based on said cache line size.

16. The computer program product according to claim 15, wherein said third instruction means for setting a maximum burst length comprises:
    instruction means for setting said burst length equal to 32 transfers when said latency timer is less than 72.

17. The computer program product according to claim 15, wherein said third instruction means for setting a maximum burst length comprises:
    instruction means for setting said burst length equal to 64 transfers when said latency timer is greater than 72 and less than 136.

18. The computer program product according to claim 15, wherein said third instruction means for setting a maximum burst length comprises:

instruction means for setting said burst length equal to 128 transfers when said latency timer is greater than 136.

19. The computer program product according to claim 15, wherein said fourth instruction means for adjusting said maximum burst length comprises:

instruction means for setting said burst length to 32 transfers, in response to determining that said cache line size is equal to 0.

20. The computer program product according to claim 15, wherein said fourth instruction means for adjusting said maximum burst length comprises:

instruction means for reducing said burst length to four times the cache line size if said burst length calculated with said latency timer value is greater than four times the cache line size.

* * * * *